US006627447B2

(12) United States Patent
Burbaum et al.

(10) Patent No.: US 6,627,447 B2
(45) Date of Patent: Sep. 30, 2003

(54) METHODS AND APPARATUS FOR HIGH THROUGHPUT PLATE TO PLATE OR PLATE TO MEMBRANE TRANSFER

(75) Inventors: Jonathan J. Burbaum, Cranbury, NJ (US); Stephen Skwish, Hamilton, NJ (US); Timothy Pryor, Mercerville, NJ (US)

(73) Assignee: Pharmacopeia Drug Discovery, Inc., Cranbury, NJ (US)

( * ) Notice: Subject to any disclaimer, the term of this patent is extended or adjusted under 35 U.S.C. 154(b) by 52 days.

(21) Appl. No.: 09/900,325

(22) Filed: Jul. 6, 2001

(65) Prior Publication Data

US 2001/0038809 A1 Nov. 8, 2001

Related U.S. Application Data

(62) Division of application No. 09/055,855, filed on Apr. 6, 1998, now Pat. No. 6,274,088.

(51) Int. Cl.[7] .................................................. G01N 35/00
(52) U.S. Cl. ........................ 436/45; 422/99; 422/102; 422/104; 422/72; 435/288.4; 435/305.1; 435/305.2
(58) Field of Search ............................... 422/99–104, 72; 436/45; 435/288.4, 305.2, 305.3, 305.4

(56) References Cited

U.S. PATENT DOCUMENTS

| 3,378,481 | A | * | 4/1968 | Saravis et al. | 204/641 |
| 4,201,335 | A | * | 5/1980 | Conn et al. | 494/9 |
| 4,314,968 | A | * | 2/1982 | Guigan | 422/64 |
| 4,912,057 | A | * | 3/1990 | Guirguis et al. | 435/288.4 |
| 5,039,493 | A | * | 8/1991 | Oprandy | 422/101 |
| 5,753,187 | A | * | 5/1998 | Reynolds et al. | 422/102 |
| 5,962,764 | A | * | 10/1999 | Briggs et al. | 800/270 |
| 6,045,760 | A | * | 4/2000 | Aizawa et al. | 422/104 |
| 6,121,054 | A | * | 9/2000 | Lebl | 436/177 |

* cited by examiner

*Primary Examiner*—Arlen Soderquist
*Assistant Examiner*—Elizabeth Quan
(74) *Attorney, Agent, or Firm*—Priest & Goldstein, PLLC (57) ABSTRACT

Techniques for high throughput parallel separation, filtration and plate-to-plate transfer are described. Cells, proteins, chemical compounds and the like are being developed in multi-well, small volume well plates, such as 1536-well plates having wells of a volume on the order of 1 $\mu$l. A mechanism for clamping such plates together so that the wells will be aligned allows rapid separation or transfer by simply centrifuging the assembly. A membrane may be clamped between the plates. Alternatively, a membrane may replace one of the plates. Centrifuge dependent and independent designs are described.

13 Claims, 6 Drawing Sheets

METHODS AND APPARATUS FOR HIGH THROUGHPUT PLATE TO PLATE OR PLATE TO MEMBRANE TRANSFER

This application is a division of allowed U.S. application Ser. No. 09/055,855 filed Apr. 6,1998 now U.S. Pat. No. 6,274,008.

FIELD OF THE INVENTION

The present invention relates generally to improvements in high throughput assays of chemical compounds, cells, proteins and the like. More particularly, the present invention relates to advantageous transfer techniques for transferring small volumes of materials from small well plates having a large plurality of wells, such as presently existing 1536-well plates, or performing separations, filtrations or the like in a similar context.

BACKGROUND OF THE INVENTION

To find lead compounds for drug discovery programs, large numbers of compounds are often screened for their activity as enzyme inhibitors or receptor agonists/antagonists. Large libraries of compounds are needed for such screening. As a result of developments in this field, it is now possible to simultaneously produce combinatorial libraries containing hundreds of thousands of small molecules for screening. With the availability of such libraries, however, has come a need for large scale, rapid screening methods.

For example, the libraries may be contained on microbeads, each compound being present in a picomolar amount. Because the amount of compound is very small, it is advantageous to conduct the high throughput screening method in very small volumes, e.g., on the order of 1 $\mu$l. Such assays can be performed in the 1536-well plate described in PCT Application Serial No. PCT/US98/00494 entitled Multi-Well Plate, filed Jan. 8, 1998 and incorporated by reference herein.

Receptor binding assays used in high throughput screening typically involve three steps. First, a labeled ligand is incubated with a target receptor in the presence of a compound to be tested for inhibition of ligand/receptor binding. Second, the receptor and ligand (and compound) are separated using filtration and/or washing of an immobilized receptor. Finally, the amount of labelled ligand bound to the receptor is quantified. This conventional screening is a 'separations-mode' assay, i.e., one in which the bound ligand is physically separated from the free ligand using either a filtration membrane or the selective adhesion of either bound or free component to a surface (e.g., the surface of a microtiter plate).

Separation, however, is typically time consuming and therefore slows high throughput screening. If fluid handling steps employed are not sufficiently precise, separation also can create variations in the signal generated in the assay and can disturb equilibrium binding conditions. Furthermore, separation has been difficult to automate and is potentially hazardous when radioactive materials are involved. These problems are particularly acute in assays conducted in microvolumes using small amounts of test compound.

Many screening assays require the transfer of cells or proteins onto membranes for evaluation of radiosotope levels, fluorescence or activity. For further details of various aspects of such assays, see U.S. patent application Ser. No. 08/868,280 filed Jun. 3, 1997 and entitled High-Throughput Assay which is incorporated by reference in its entirety herein. The small well size and volume used in the 1536-well plates preclude the use of conventional cell harvesting equipment.

For larger wells and lower throughput, Millipore provides a filtration system for use with 96-well format plates designated the MULTISCREEN® ASSAY SYSTEM. In that system, individual membranes are sealed to 96 independent wells for use with a vacuum manifold. The membranes are relatively complex and expensive, and the vacuum manifold is relatively slow. Overall this system is not advantageously scaleable to the small volumes used with high throughput plates such as 1536-well plates.

Other conventional plate-to-plate transfer systems are inadequate at the small volumes used in 1536-well plates. Typical systems involve physical removal of the sample into a cannula or syringe, either with concomitant dispensing of a wash stream from a plate washer or in an aspirate/dispense mode. This modality is impractical using 1536-well plates due to the number of parallel operations that are needed to maintain an acceptably high throughput. In order to extend the prior art to 1536-well plates, a technique would need to be developed (at considerable expense) for fabricating parallel aspirate/dispense channels which might have disposable tips or washable cannulae to prevent contamination.

Thus, it would be highly desirable to have simpler, faster and more economical alternatives for transfers and separations of materials from a multiplicity of vessels, such as the wells of a microtiter plate. Further, to provide a rapid separation of cells or proteins from solutions within low volume high throughput plates, such as 1536-well plates, and to provide a mechanism for rapid plate-to-plate transfer of samples from one plate to another will be recognized as highly advantageous.

SUMMARY OF THE INVENTION

In one aspect, methods and apparatus in accordance with the present invention advantageously use presently existing disposables to transfer samples in parallel. In other words, a whole plate is transferred at once. No other additional disposables are needed except for an optional membrane which can be selected from a number of conventionally available products.

Alternatively, the transfer may be from a plate to a membrane.

Centrifugation is employed to achieve such rapid separation either from one plate to another (plate-to-plate transfer) or from a plate onto a transfer membrane ("harvesting"). To achieve this separation, apparatus to secure and align and clamp two plates is provided. Both centrifuge dependent and independent designs are described. The approach of the present invention is also applicable to parallel filtration operations and the like.

A more complete understanding of the present invention, as well as further features and advantages of the invention, will be apparent from the following Detailed Description and the accompanying drawings.

DETAILED DESCRIPTION

The present invention advantageously achieves rapid separations and transfer by centrifugation, either from one plate to another (plate-to-plate transfer) or from a plate onto a transfer membrane (harvesting). To achieve this end, apparatus is provided to adequately secure two aligned 1536-well plates, optionally with a membrane between them, for centrifugal transfer. These 1536-well plates are designed symmetrically so that when one is inverted on top of another, the wells are in alignment. For further details of a presently preferred 1536-well plate see PCT Application Serial No. PCT/US98/00494 filed Jan. 8, 1998. While the discussion to follow is in the context of 1536-well plates, it will be recognized that the invention will also be applicable to other high throughput, low volume well plates having a larger number of wells. It will also be applicable to plates having a smaller number of wells, such as 96, so long as those wells are low volume, for example, approximately 1 $\mu$l. An important design characteristic is adequate pressure on the plates and membranes to prevent leakage of samples from one well to the next while maintaining the alignment defined by the alignment holes.

Figure 1:
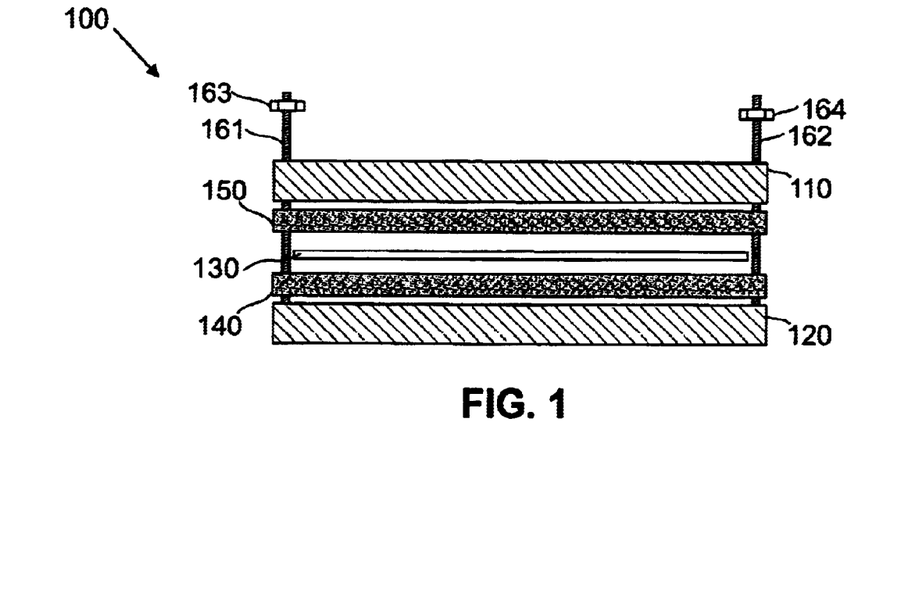
FIG. 1 illustrates a first embodiment of the present invention for high throughput plate-to-plate or plate to membrane transfer which is centrifuge independent.

A first embodiment shown in FIG. 1 is centrifuge independent. As shown in FIG. 1, transfer apparatus 100 consists of two compressing plates 110 and 120 of adequately stiff material. One example of a suitable material is aluminum. It will be recognized that other materials may also be utilized. Optionally, a compression spring (not shown) and plate combination may be employed to apply a uniform normal force between the plates 110 and 120 that are assembled with the membrane 130 and 1536-well plates 140 and 150 to form transfer apparatus 100. Alignment is maintained by the posts 161 and 162 and pressure on the plates is adjustably provided by appropriate tightening of nuts 163 and 164. While two posts are shown with tightening nuts, it will be recognized that additional posts or an alternative compression or clamping mechanism, such as an air bladder arrangement to provide clamping force using air pressure or a spring-loaded clamp, may also be utilized. A torque wrench may be used to tighten the nuts 163 and 164 with a torque of 6 inch pounds (in.-lbs.). As addressed further below in conjunction with FIG. 6, the assembly 100 is then mounted in a centrifuge which may suitably be a Forma model 5681 three liter swinging bucket plate centrifuge and rotated at 1500 rpms for one minute to achieve bulk parallel separation.

Figure 2:
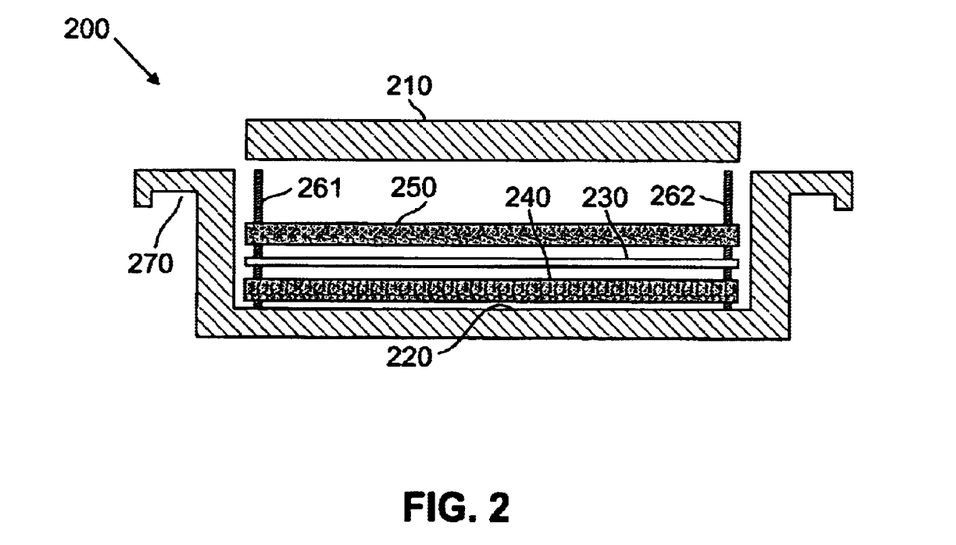
FIG. 2 illustrates a second embodiment of the present invention for high throughput plate-to-plate or plate to membrane transfer which is centrifuge dependent.

FIG. 2 illustrates a second embodiment of the present invention which is centrifuge specific. FIG. 2 illustrates a transfer assembly 200 including a rotor bucket 270 designed to fit a particular centrifuge. In the assembly 200, a base 220 of rotor bucket 270 replaces the bottom compression plate 120 of assembly 100. Threaded posts 261 and 262 extend from the base 220. Membrane 230 and 1536-well plates 240 and 250 are sandwiched between a compression plate 210 and the base 220. Nuts (not shown) may again be tightened on threaded ends of posts 261 and 262 using a torque wrench and applying a torque of 6 inch pounds. The plates 240 and 250 are then preferably rotated at 1500 rpms for one minute to affect the desired separation.

Figure 3:
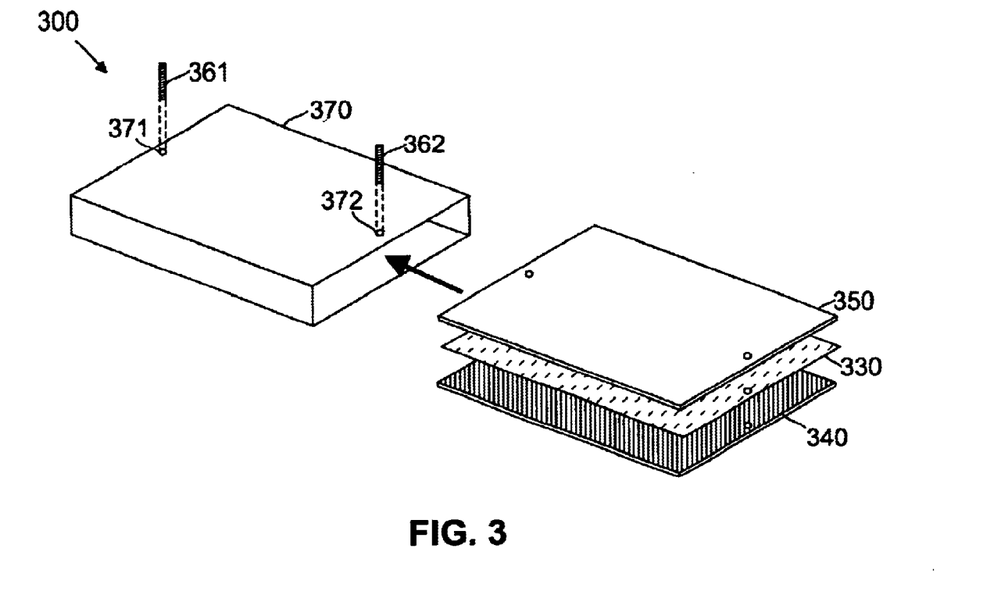
FIG. 3 illustrates a third embodiment of the present invention for high throughput plate-to-plate or plate to membrane transfer.

In a third embodiment shown in FIG. 3, an assembly 300 includes an enclosing box 370. Box 370 is a tight-fitting box, which is open at one end. As two 1536-well plates 340 and 350 separated by an optional membrane 330 are inserted into the open end of box 370, they are forced together by the tight fit (like a deck of cards being slid into its box). Alignment posts 361 and 362 are inserted through holes 371 and 372 in the box 370, as well as through matching holes in the membrane 330 and the plates 340 and 350 to insure proper alignment throughout centrifugation. Threaded ends of posts 361 and 362 may be utilized to attach assembly 300 to an appropriate centrifuge. Centrifugal force drives liquid from the wells in plates 350, which may be termed a source plate, and into plate 340, which may be termed a target plate. The optional membrane 330 may be used to perform a filtration or an adhesion step.

Figure 4A:
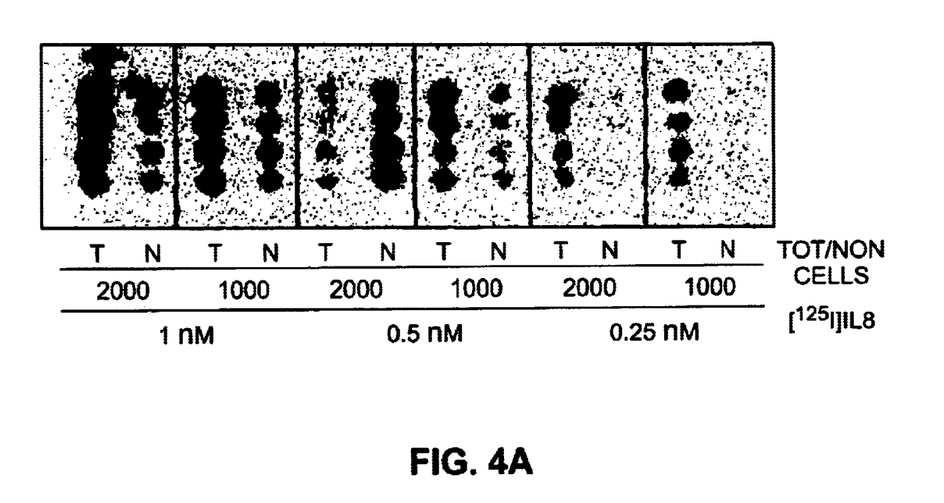
FIGS. 4A and 4B show data from an exemplary transfer of labeled cells to a PVDF membrane utilizing 1536-well plates.
Figure 4B:
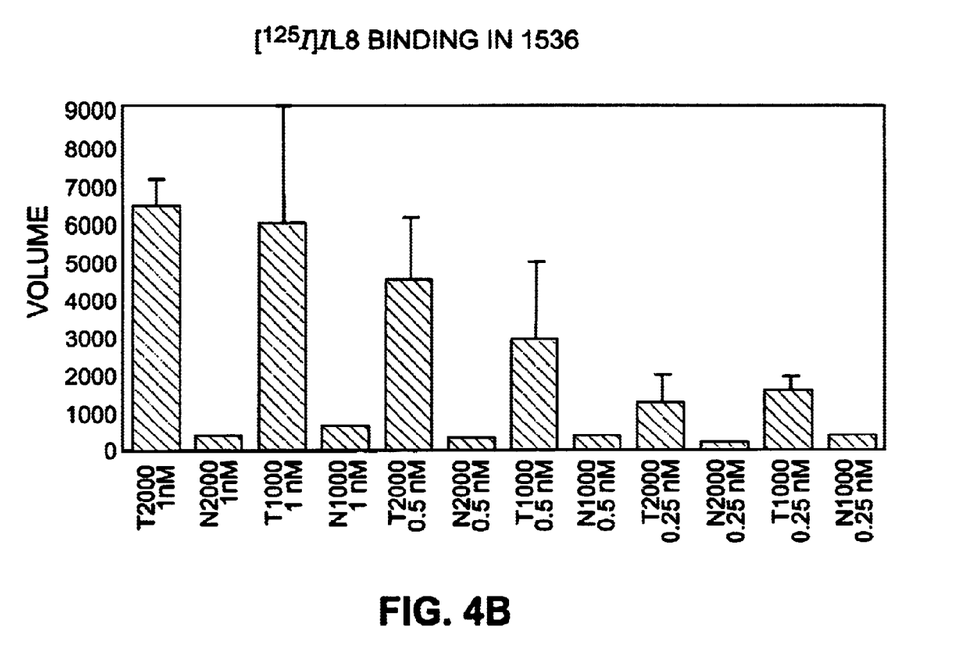

FIGS. 4A and 4B show data from a transfer of labeled cells from a 1536-well plate to a polyvinylidine difluoride (PVDF) membrane. In this experiment, a column of empty wells was employed between each column of filled wells to make it easier to see if cross-contamination had occurred. Chinese hamster ovary (CHO) cells containing the interleukin-8 receptor, subtype B (IL8B receptor) were grown to a confluency in a standard T-75 tissue culture flask. The cells were then removed from the flask (trypsin, 5 mm), and washed twice with buffer (BSS/BSA). CHO/IL8B cells were then counted and diluted to 2,000 or 1,000 cells per $\mu$L using the same buffer. These suspended cells were incubated with various concentrations of [$^{215}$I]IL8 (as indicated in FIG. 4A, 1, 0.5 and 0.25 nM) with or without cold competitor (unlabelled IL8, 1 $\mu$M) for 1 hour. The total [$^{125}$I]IL8 bound (the total is seen above the letter T in figs. 4A and 4B) was quantitated without cold competitor, while non-specifically bound $^{125}$I (the non-specifically bound is seen above the letter N in FIGS. 4A and 4B) was measured with competitor. Aliquots (1 $\mu$L) of each sample were pipetted in quadruplicate into a 1536-well plate, which was then inverted onto a PVDF membrane and clamped into the centrifugation assembly of the present invention. The apparatus was then centrifuged (1500 RPM, 1 mm) to transfer cells to the membrane, inverted and re-centrifuged to remove the unbound supernatant. The membrane was then removed and sealed in plastic wrap and placed face down onto a phosphor screen for 1 hour. The screen was imaged for 7 minutes on a STORM phosphorimager manufactured by Molecular Devices and quantitated using software adapted to quantify objects by processing captured images of the objects, with the specific software employed in the present exemplary case being the IMAGEQUANT software provided by the manufacturer. The distinct spots seen in FIG. 4A that cross-contamination has not occurred while the desired spatial separation of samples has been achieved.

Figure 5A:
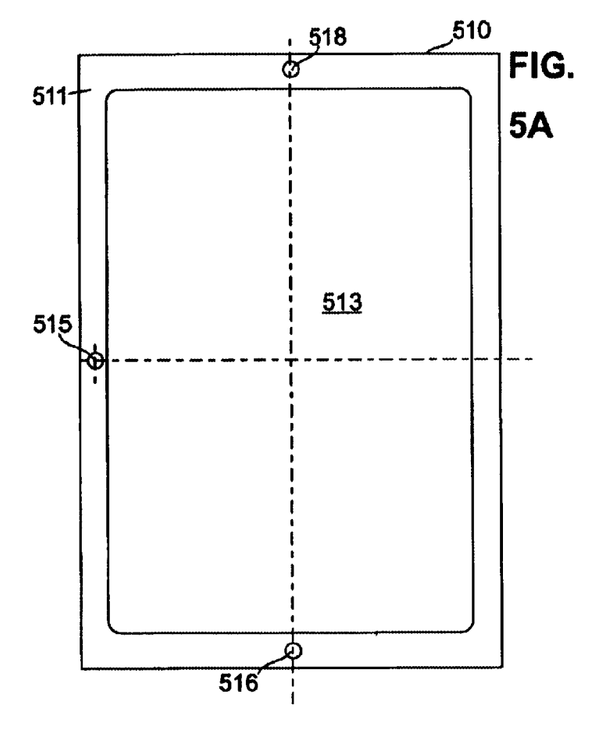
FIGS. 5A–D illustrates details of compression plates which may be suitably used in conjunction with the embodiments of FIGS. 1–3.
Figure 5B:
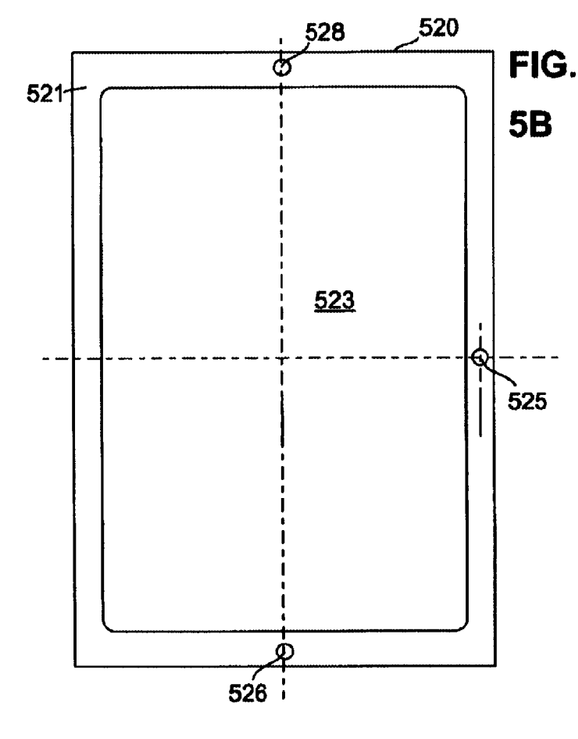

FIGS. 5A–5D show a presently preferred embodiment of compression plates 510 and 520 for use in conjunction with the present invention. FIGS. 5A and 5B show top down views and FIG. 4B shows a graph of the data generated in which error bars represent ±$\sigma$.

Figure 5C:
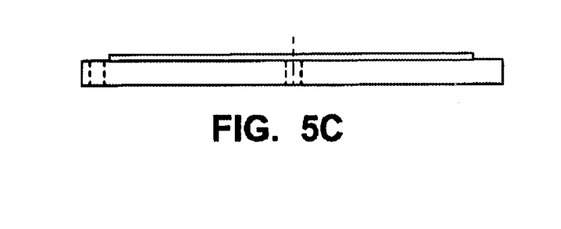
Figure 5D:
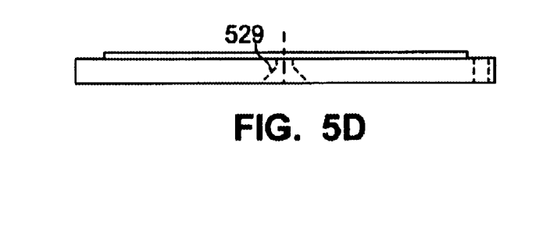

FIGS. 5C and 5D show edge on views. Plates 510 and 520 are each preferably formed from a solid piece of aluminum which is approximately 3 ½"×5 3/16"×¼". Two 0.05 inch recesses 511 and 521 are cut around the edges of the top surfaces of the plates 510 and 520. At the top and bottom, each recess is approximately 0.29" wide, and on the left and right each recess is approximately 0.23" wide. The creation of the recesses 511 and 521 results in the plates 510 and 520 having raised central portions 513 and 523 which fit into a matching recess in the base of a standard 1536-well plate.

For plate to plate transfer, a first 1536-well plate is seated on compression plate 510 an a second 1536-well plate having material to be transferred is seated on compression plate 520. A threaded dowel pin (not shown) is then screwed into threaded hole 515 in the plate 510. The two compression plates 510 and 520 are folded or placed together like a sandwich. Because the wells in the 1536-well plate are so small, liquid does not escape or leave those wells even when the second 1536-well plate is turned on its side or upside down to form the sandwich. The present invention is suited to any wells having this characteristic. The end of the dowel pin sticks up into a matching hole 525 in plate 520 to assist in the alignment process. Then, size number 5 flat head screws are passed through holes 526 and 528 of top plate 520 and screwed into threaded holes 516 and 518 of bottom plate 510. As previously addressed a torque of 6 inch pounds may suitably be employed. As shown in FIG. 5D, a surface 529 of holes 526 and 528 is countersunk so that the underside of the head of the screws seats snugly in these holes. The dashed lines present in 5A–5D help illustrate the relative alignments of the holes in FIGS. 5A and 5B, 5A and 5C and 5B and 5D. When sandwiched or assembled, the overall unit is approximately 3 ½"×5 3/16"×2 ¼" and may be utilized with a standard centrifuge bucket. For plate to membrane transfer, the plate 520 may be replaced by a similarly dimensioned flat block of aluminum.

While two screws are shown to compress the plates 510 and 520, it will be recognized that other compression mechanisms may also be employed. For example, the center portion 513 might be a separate piece which was spring or otherwise loaded so that more uniform pressure on the 1536-well plates might be employed.

Figure 6:
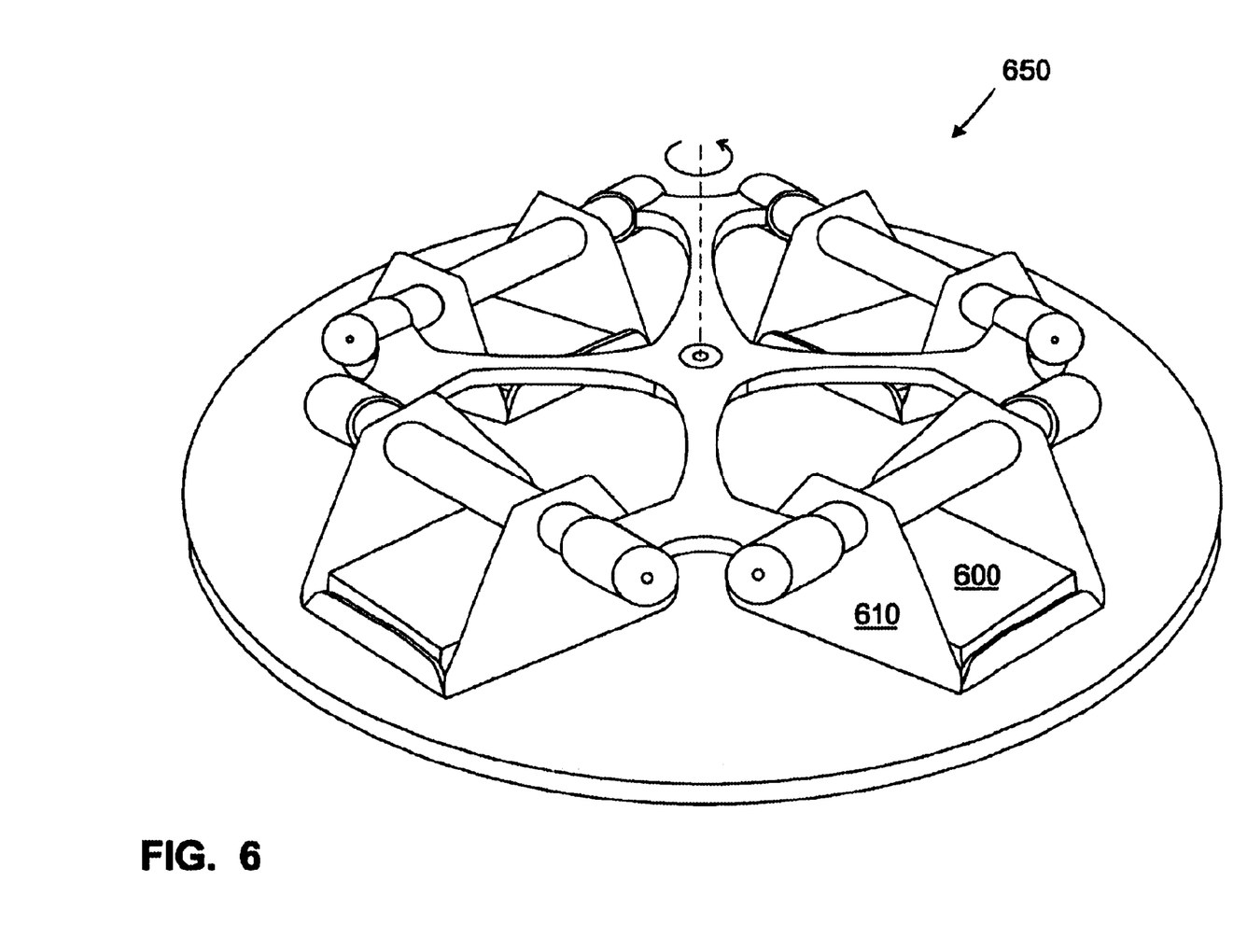
FIG. 6 illustrates a centrifuge and transfer assembly which may suitably effect plate-to-plate or plate to membrane transfer, separation, filtration or the like in accordance with the present invention.

FIG. 6 illustrates how a high throughput transfer assembly 600, which might be any of the assemblies of FIGS. 1, 3 or 5, maybe suitably inserted into a bucket 610 of a centrifuge 650 for centrifuging. The dashed line present in FIG. 6 illustrates the axis of rotation of the centrifuge 650. The presently preferred centrifuge is a FORMA Model number 5681 three liter swinging bucket plate centrifuge, although other centrifuges may be employed.

Figure 7:
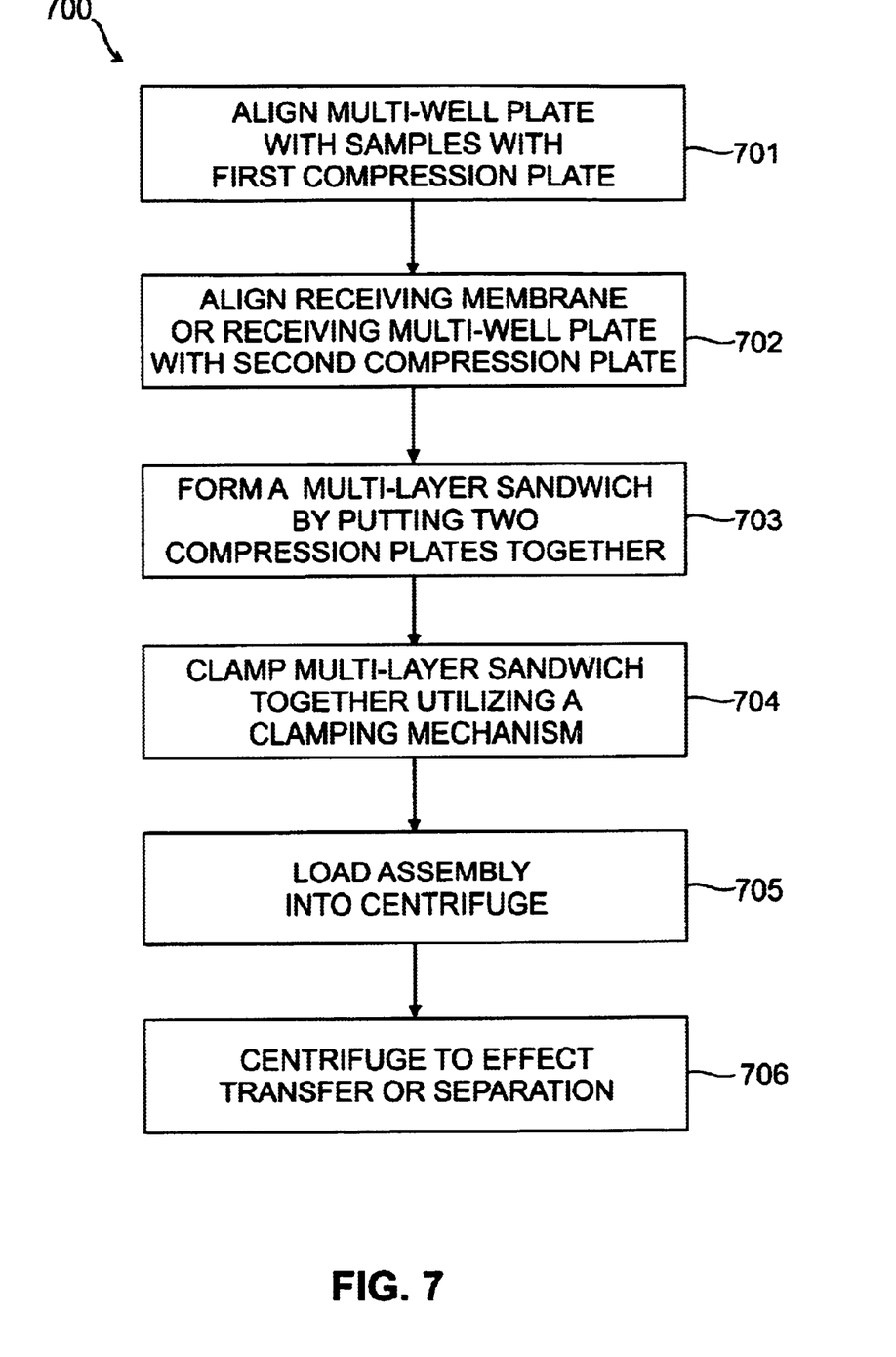
FIG. 7 is a flowchart illustrating the process steps of one method of plate-to-plate or plate to membrane transfer or separation in accordance with the present invention.

FIG. 7 shows a flowchart of a method 700 of plate to plate or plate to membrane high throughput transfer or separation in accordance with the present invention. In step 701, a multi-well microtiter plate which has a large plurality of low volume wells, such as a 1536-well plate, is aligned with a first compression plate, such as plate 520 of FIG. 5. This microtiter plate has material in liquid in its wells. In step 702, a receiving membrane or receiving multi-well plate is aligned with a second compression plate, such as plate 510 of FIG. 5. As discussed above, a membrane may also be disposed in-between multi-well plates.

In step 703, a multilayer sandwich is formed by putting the two compression plates together. Proper alignment is preferably aided and maintained utilizing an alignment mechanism such as the pin and holes 515 and 525 of FIG. 5.

Next, in step 704, the multi-layer sandwich is clamped together utilizing a clamping mechanism, such as the screws and threaded holes 516, 518, 526 and 528 of FIG. 5. In step 705, the resulting assembly is loaded into a centrifuge bucket. Finally, in step 706, the assembly is centrifuged to effect transfer or separation. Subsequently, assays or other analysis may be performed.

While the present invention has been disclosed in a presently preferred embodiment, it will be recognized that the present teachings and claims may be embodied in a variety of formats adapted to particular applications as necessary to achieve the desired result of high throughput parallel transfer or separation in conjunction with multi-well plates with low volume wells. By way of example, different torques may be employed as needed to prevent leakage from well to well, different clamping mechanisms may be adapted to suit particular applications and environments, and centrifuge speed may be adapted to the materials and operation to be conducted.

We claim:

1. A method for high throughput parallel plate-to-plate transfer of material in liquid contained within closed bottom wells of a first multi-well plate having a large plurality of small volume closed bottom wells, the method comprising the steps of:

placing a second multi-well plate having a large plurality of small volume closed bottom wells in alignment with the first multi-well plate;

clamping the multi-well plates in place, using a clamping mechanism to exert sufficient compression force to the plates to prevent cross-contamination among wells; and centrifuging the assembly of multi-well plates to transfer material from the first multi-well plate to the second multi-well plate.

2. The method of claim 1 further comprising the step of placing a membrane between the first and second multi-well plates before placing the second multi-well plate in alignment with the first multi-well plate.

3. A method for high throughput centrifugal parallel plate to membrane transfer of liquid contained within a plurality of wells of a multi-well plate to a membrane, the method comprising:

placing a multi-well plate in an inverted position, the wells of said multi-well plate having a closed bottom and a sufficiently small volume such that the force of gravity does not cause the liquid contained in the wells to flow from the wells when the multi-well plate is placed in the inverted position;

placing a first side of the membrane adjacent to the large plurality of wells of the multi-well plate such that the first side of the membrane is aligned with the surface of the multi-well plate containing the large plurality of wells and such that the first side of the membrane covers the large plurality of wells;

disposing a first compression plate such that a broad planar surface of the first compression plate touches and is in alignment with a broad planar surface of the multi-well plate;

disposing a second compression plate so as to touch and cover a second side of the membrane;

clamping the first compression plate, the multi-well plate, the membrane, and the second compression plate in a multi-layer sandwich utilizing a clamping mechanism, clamping being performed in A such a way that the first compression plate and the second compression plate tend to exert a generally evenly applied pressure tending to force the plate and the membrane together, the pressure being sufficient to prevent leakage of material during centrifugation; and centrifuging the multi-layer sandwich to perform high throughput centrifugal parallel plate to membrane transfer.

4. The method of claim 3 wherein the membrane is coextensive in area with the multi-well plate.

5. The method of claim 4 further comprising the step of holding the multi-well plate and the membrane in alignment utilizing an alignment mechanism.

6. The method of claim 4 wherein the second compression plate comprises a base portion of a rotor bucket.

7. The method of claim 4 wherein the multi-well plate, the membrane, the first compression plate, and the second compression plate each include at least two alignment holes, the method further comprising the step of inserting alignment posts through holes.

8. The method of claim 7 wherein the alignment posts include a threaded portion, the method farther comprising the step of tightening nuts onto the threaded portion with a predetermined torque such that the alignment posts exert a desired force tending to compress the plates together.

9. The method of claim 8 wherein the predetermined torque is six inch pounds.

10. The method of claim 7 wherein the alignment posts are screws and the step of inserting the alignment posts further comprises the step of screwing the alignment posts into the alignment holes.

11. A method for high throughput centrifugal parallel plate to plate transfer of liquid contained within a plurality of wells of a first multi-well plate to a second multi-well plate, the method comprising:

placing a first multi-well plate in an inverted position, the wells of said first multi-well plate having a closed bottom and a sufficiently small volume such that the force of gravity does not cause the liquid contained in the wells to flow from the wells when the first multi-well plate is placed in the inverted position;

placing a first compression plate adjoining the first multi-well plate;

placing a second multi-well plate adjoining the first multi-well plate such that the wells of the second multi-well plate adjoin the wells of the first multi-well plate;

placing a second compression plate adjoining the second multi-well plate;

clamping the first compression plate, the first multi-well plate, the second multi-well plate, and the second compression plate in a multi-layer sandwich using a clamping mechanism, clamping being performed in such a way that the compression plates exert a generally evenly applied pressure tending to force the first and second multi-well plates together, the pressure being sufficient to prevent leakage of material during centrifugation; and centrifuging the multi-layer sandwich to perform high throughput centrifugal parallel plate to plate transfer.

12. The method of claim 11 further comprising the step of placing a membrane adjacent to the plurality of wells of the first multi-well plate and the plurality of wells of the second multi-well plate.

13. The method of claim 11 further comprising the step of holding the first multi-well plate and the second multi-well plate in alignment utilizing an alignment mechanism.

* * * * *